(12) United States Patent
Nomura

(10) Patent No.: US 8,653,766 B2
(45) Date of Patent: Feb. 18, 2014

(54) LINEAR MOTOR DRIVING SYSTEM AND LINEAR MOTOR CONTROL METHOD

(75) Inventor: Yuki Nomura, Shinagawa-ku (JP)

(73) Assignee: THK Co., Ltd., Tokyo (JP)

( * ) Notice: Subject to any disclaimer, the term of this patent is extended or adjusted under 35 U.S.C. 154(b) by 51 days.

(21) Appl. No.: 13/499,166

(22) PCT Filed: Sep. 13, 2010

(86) PCT No.: PCT/JP2010/065717
§ 371 (c)(1),
(2), (4) Date: Mar. 29, 2012

(87) PCT Pub. No.: WO2011/040216
PCT Pub. Date: Apr. 7, 2011

(65) Prior Publication Data
US 2012/0187873 A1    Jul. 26, 2012

(30) Foreign Application Priority Data
Sep. 30, 2009    (JP) .................................. 2009-226478

(51) Int. Cl.
*H02K 41/00*    (2006.01)
(52) U.S. Cl.
USPC ........ 318/135; 318/700; 310/12.01; 310/112; 310/114
(58) Field of Classification Search
USPC ...................... 318/135, 700; 310/12, 112, 114
See application file for complete search history.

(56) References Cited

U.S. PATENT DOCUMENTS

| | | | | |
|---|---|---|---|---|
| 5,252,902 A * | 10/1993 | Uehara et al. | ................. | 318/599 |
| 5,410,234 A * | 4/1995 | Shibata et al. | ................. | 318/700 |
| 6,184,644 B1 * | 2/2001 | Eguchi | ......................... | 318/632 |
| 6,876,896 B1 * | 4/2005 | Ortiz et al. | .................... | 700/112 |
| RE39,747 E * | 7/2007 | Peltier et al. | ................ | 310/12.11 |
| 8,169,116 B2 * | 5/2012 | Oya et al. | ....................... | 310/112 |
| 2008/0106155 A1 * | 5/2008 | Yamada et al. | .................. | 310/12 |
| 2010/0044144 A1 * | 2/2010 | Tajima et al. | .................. | 180/443 |

FOREIGN PATENT DOCUMENTS

| | | |
|---|---|---|
| JP | 11-353028 A | 12/1999 |
| JP | 2000-245128 A | 9/2000 |
| JP | 2004-56892 A | 2/2004 |
| JP | 2004-80881 A | 3/2004 |

* cited by examiner

*Primary Examiner* — Eduardo Colon Santana
*Assistant Examiner* — Bickey Dhakal
(74) *Attorney, Agent, or Firm* — Sughrue Mion, PLLC

(57) ABSTRACT

In a linear motor, a driving device calculates a deviation between a position command from a controller and a position detected by a position sensor, a position controlling is performed calculating speed command to be utilized for speed controlling of the movable member based on the deviation and a position gain, a deviation is calculated at a time when the movable member enters a control area in which at least a part of the magnet portion opposes to the coil of the stator within an area of which position is detected by the position sensor, and the position of the movable member is back-calculated from deviation from the position command and the position command, and the position detected by the position sensor is corrected with the calculated position being as the position of the movable member at a time when the movable member enters the control area.

5 Claims, 9 Drawing Sheets

LINEAR MOTOR DRIVING SYSTEM AND LINEAR MOTOR CONTROL METHOD

CROSS REFERENCE TO RELATED APPLICATIONS

This application is a National Stage of International Application No. PCT/JP2010/065717, filed on Sep. 13, 2010, which claims priority from Japanese Patent Application No. 2009-226478, filed on Sep. 30, 2009, the contents of all of which are incorporated herein by reference in their entirety.

TECHNICAL FIELD

The present invention relates to a linear motor utilized for driving a bogie or like of a conveying apparatus, and more particularly, to a driving system of a linear motor in which stators are arranged in a distributed manner and also relates to a control method for the linear motor.

BACKGROUND ART

In general, a linear motor utilized for conveying parts or works has a structure in which a movable member moves on one stator. However, in a structure having a long conveying path provides a defect of increasing in facility cost, thus being defective, and in order to avoid such defect, there has been proposed a method of arranging a plurality of stators in a distributed or separated manner. With such stator distributed arrangement (non-continuous arrangement), for example, Patent Document 1 discloses a linear motor speed-variation reduction method, without causing uneven speed even in adoption of a ground primary-side distributed arrangement system which is driven in an open-loop manner, by considering a relationship between a position of a secondary-side bogie and acceleration.

PRIOR ART DOCUMENT

Patent Document

Patent Document 1: Japanese Patent Application Laid-open Publication No. 2004-80881

DISCLOSURE OF THE INVENTION

Problems to be Solved by the Invention

Incidentally, in stators arranged separately in a distributed manner, it is necessary to control a position of the movable member in consideration of mutual relationship between a plurality of stators and a plurality of movable members different from a structure in which one movable member on one stator is controlled.

However, in the technology disclosed in the Patent Document 1, the movable member is accelerated or decelerated in a region in which the movable member is opposed to the stator, and on the other hand, the movable member is traveled or run by an inertia force in a region in which the movable member is not opposed to the stator. That is, in such conventional technology, the movable member is not always controlled nor the position of the movable member now moving is not fed back to be controlled. Moreover, the movable member is re-accelerated in the region in which the movable member is opposed to the stator and is then decelerated, which will cause variation in speed.

The present invention was conceived in consideration of the circumstances mentioned above and an object thereof is to provide a driving system of a linear motor and a method of controlling linear motor in which stators are arranged in a distributed or separated manner so as to prevent unnecessary speed variation of the movable member to thereby smoothly control the position of the movable member.

Means for Solving the Problems

To achieve the above object, the present invention recited in claim 1 is a driving system of a linear motor, comprising:

a linear motor including a movable member and a plurality of stators, the movable member being provided with a magnet portion and a scale portion, the magnet portion including a plurality of magnets arranged side by side, the plurality of stators each including a coil and a position sensor for detecting, from the scale portion, a position of the movable member in a moving direction along which the magnets are arranged side by side, in which the movable member moves in the moving direction; and a plurality of driving devices each of which controls an electric current flowing the coil of the corresponding stator, wherein the plural stators are arranged in the moving direction of the movable member, a distance between the coils of the adjacent stators is less than a length of the magnet portion in the moving direction of the movable member, and a distance between the position sensors of the adjacent stators is less than a length of the scale portion; and wherein each of the driving devices includes a position controller for performing position controlling by calculating a deviation between a position command value from a controller and a position detected by the position sensor of the corresponding stator and then calculating a speed command to be used for the speed controlling of the movable member based on the deviation and a position gain, and a back-calculating unit for back-calculating the deviation with the moving speed of the movable member being as a speed command and then back-calculating the position of the movable member from the deviation and the position command when the movable member enters a control area in which at least one of the magnets of the magnet portion opposes to the coil of the stator within an area of which a position is detected by the position sensor of the corresponding stator, in which the position controller performs the position controlling by correcting the position detected by the position sensor with the position calculated by the back-calculating unit being as a position of the movable member at a time when the movable member enters the control area.

The invention recited in claim 5 is a method of controlling a linear motor which includes: a movable member provided with a magnet portion and a scale portion, the magnet portion including a plurality of magnets arranged side by side; and a plurality of stators each including a coil and a position sensor for detecting a position of the movable member in a moving direction along which the magnets are arranged side by side, in which the movable member moves in the moving direction, wherein:

the plural stators are arranged in the moving direction of the movable member;

a distance between the coils of the adjacent stators is less than a length of the magnet portion in the moving direction of the movable member;

a distance between the position sensors of the adjacent stators is less than a length of the scale portion;

a deviation is back-calculated by multiplying a position gain to the moving speed of the movable member at a time when the movable member enters a control area in which at least one of the magnets of the magnet portion opposes to the coil of the stator within an area of which position is detected by the position sensor of the stator;

the position of the movable member is back-calculated by subtracting the deviation from the position command from a controller; and feedback control of the position of the movable member is performed by correcting the position detected by the position sensor with the back-calculated position being as the position of the movable member at a time when the movable member enters the control area.

Effect of the Invention

According to the present invention, when the movable member moves in a manner straddling a plurality of stators, it becomes possible to prevent the speed of the movable member from unnecessarily varying and to perform position controlling of the movable member while smoothly driving the movable member.

MODES FOR CARRYING OUT THE INVENTION

A best mode for embodying the present invention will be explained hereunder with reference to the accompanying drawings.

First, schematic structure and function of a driving system of a distributed arrangement linear motor, in which a plurality of stators are arranged in a distributed manner, according to the present embodiment will be explained with reference to the drawings.

FIGS. 1 to 4 are schematic views representing a driving system of a distributed arrangement linear motor according to the present embodiment. FIG. 5 is a block diagram showing one example of structure of the motor driving device of FIG. 1. Further, it is to be noted that in the following disclosure the term "distributed arrangement linear motor" represents a linear motor in which a plurality of stators are arranged in a distributed manner.

Figure 1:
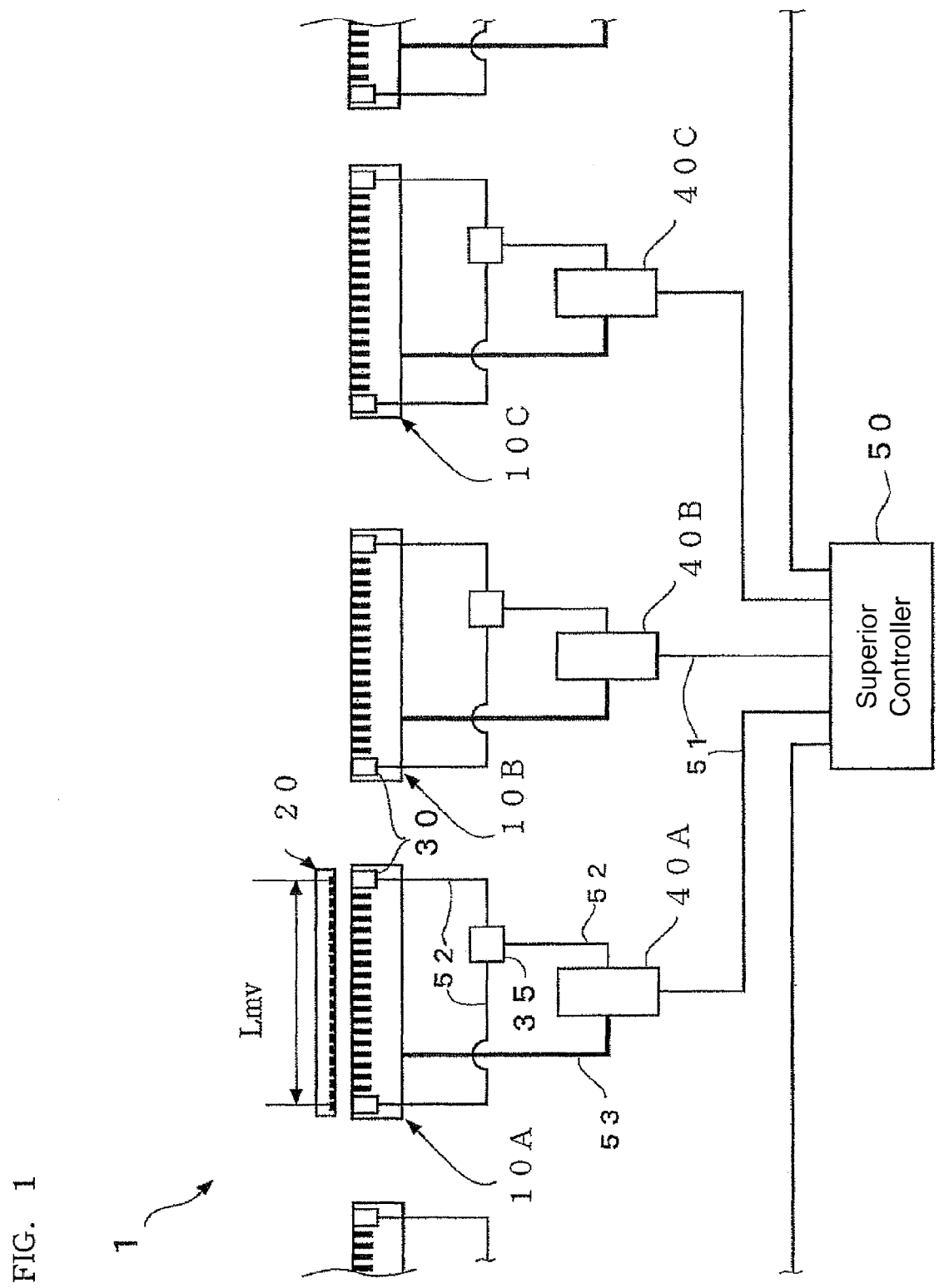
FIG. 1 is a block diagram showing one example of a schematic structure of a driving system of a distributed arrangement linear motor according to one embodiment.

As shown in FIG. 1, the driving system of the distributed arrangement linear motor includes a distributed arrangement linear motor 1 for conveying parts or works, a plurality of motor drivers (motor driving devices) 40 (40A, 40B, 40C) for controlling the distributed arrangement linear motor 1, and a superior (higher-level) controller 50 for controlling the plural motor drivers 40 (40A, 40B, 40C).

The distributed arrangement linear motor 1 includes a plurality of stators 10 (10A, 10B, 10C). The distributed arrangement linear motor also includes a movable member 20 relatively movable with respect to the stators 10 by magnetic action therebetween. Further more, the distributed arrangement linear motor 1 also includes a plurality of position detectors (position detecting devices) 30 mounted to the respective stators 10A, 10B, 10C. The respective position detectors 30 detect positions of the movable member 20 relative to the stators. Furthermore, the distributed arrangement linear motor 1 includes position information switches (switching devices) 35 provided for the respective stators 10A, 10B, 10C. The respective position information switches 35 act to switch signals from the plural position detectors 30 of the arranged stators, and in the distributed arrangement linear motor 1, the stators 10A, 10B, 10C are arranged in a separated distributed manner at predetermined intervals in the movable member conveying direction. Further, it is to be noted that this distributed arrangement linear motor 1 is one example of a flat-type linear motor.

The superior controller 50 and the respective motor drivers 40A, 40B, 40C are connected each other by means of control lines 51. The motor drivers 40A, 40B, 40C and the position information switches 35 corresponding respectively to the motor drivers 40 are connected each other by means of encoder cable 52. The position information switches 35 and the position detectors 30 provided for the corresponding same stator 10A, 10B or 10C are also connected by means of encoder cable 52. The motor drivers 40A, 40B and 40C and the stators 10A 10B, 10C are connected, correspondingly respectively to each other, by means of power cables 53.

Further, the movable member 20 is guided along a predetermined truck by a guide device, not shown, and a gap between the movable member 20 and each of the stator 10 is maintained.

Figure 2:
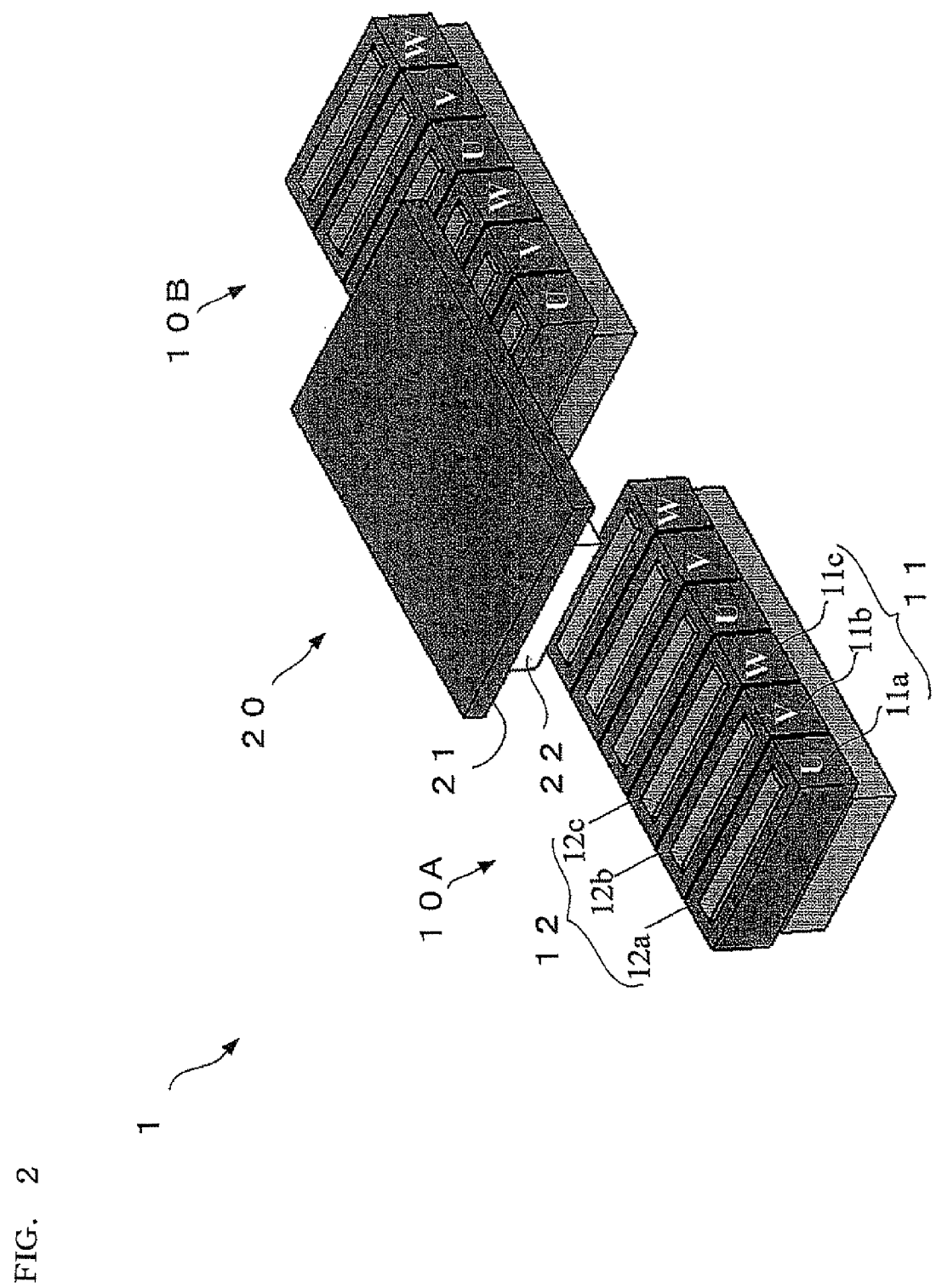
FIG. 2 is a perspective view of one example, in a pattern diagram, of a stator and a movable member of the distributed arrangement linear motor shown in FIG. 1.
Figure 4:
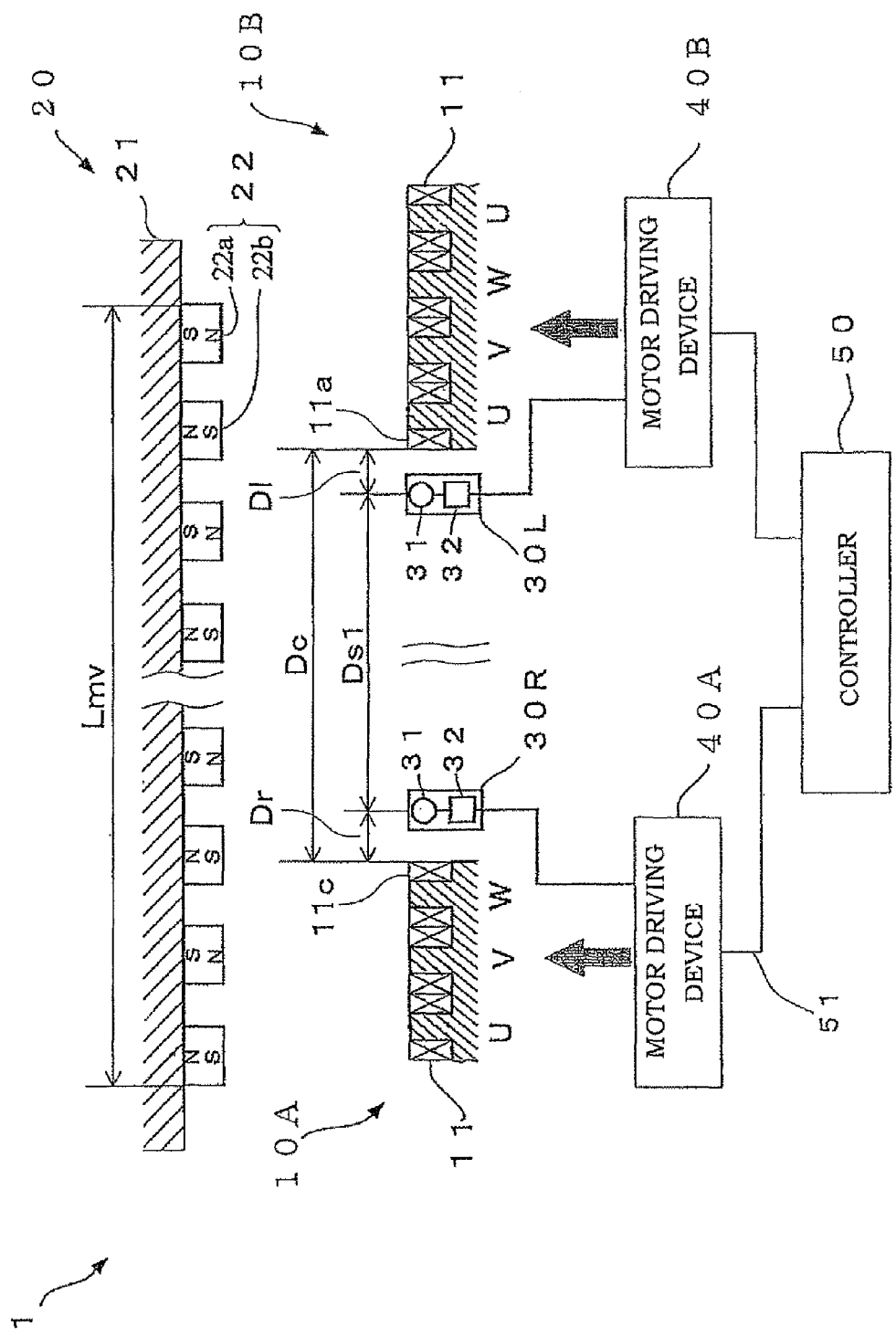
FIG. 4 is a side view as a pattern diagram representing a relationship between the stator and the movable member shown in FIG. 1.
Figure 5:
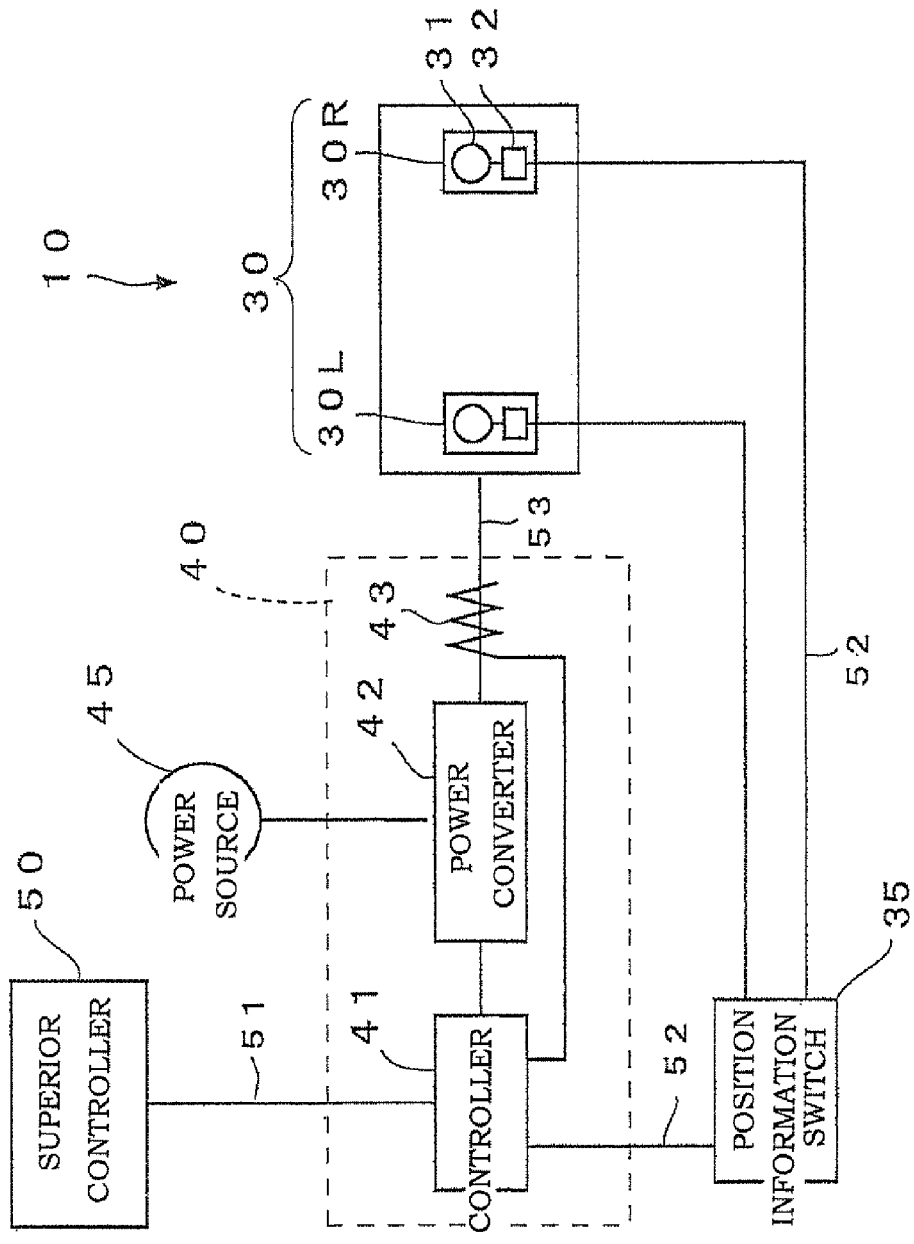
FIG. 5 is a block diagram showing one example of a structure of a motor driving device shown in FIG. 1.

As shown in FIGS. 2 and 4, each of the stators 10 is supplied with three-phase current, and includes a coil 11 acting magnetically to the movable member 20, and a projecting pole 12 around which the coil 11 is wound up. The coil 11 includes three-kinds of coils of a U-phase coil 11a, a V-phase coil 11b and a W-phase coil 11c. The projecting pole 12 includes three kinds of projecting poles 12 of a pole 12a for the U-phase, a pole 12b for the V-phase and a pole 12c for the W-phase corresponding to the coils 11a, 11b and 11c, respectively. These coils 11a, 11b, 11c and the projecting poles 12a, 12b, 12c constitute a periodic structure in which these coils and poles are arranged periodically in a direction of the relative motion between the stators 10 and the movable member 20 in order of U-phase, V-phase and W-phase. That is, the coils 11 and the poles 12 constitute the periodic structure of U-phase, V-phase and W-phase in the longitudinal direction of the stators 10 (the direction of the relative motion) as one example of a moving direction.

Further, the core portion of the electromagnet of the stator 10 including the projecting pole 12 is composed of magnetic material having less magnetic hysteresis loss such as silicone steel, and as shown in FIG. 2, the core portion form projecting pole 12 extending in the width direction of the stator 10 so as to project on a side opposing to the movable member 20, and such projecting poles 12 are arranged side by side in a comb-shape in the longitudinal direction of the stator 10.

Next, the movable member 20 is provided with, as shown in FIG. 2, a table 21 on which parts or work is rested and a magnet 22 for driving (driving magnet 22) mounted on the lower surface of the table 21, the movable member 20 thus acting as a carrier for the parts or work.

The magnets 22 for driving each includes an N-pole magnet 22a having an N-pole on a side opposing to the stators 10 and an S-pole magnet 22b having an S-pole, and a periodic structure, in which the N-pole magnets 22a as N-poles and the S-pole magnets 22b as S-pole are alternately arranged periodically in the direction of the relative motion between the stators 10 and the movable member 20. That is, the movable member 20 has the periodical structure of the N-pole/S-pole in the direction of the relative motion between the stators 10 and the movable member 20. Further, the magnet 22 for driving is one example of a magnet portion or scale portion.

Movable magnetic field is caused in accordance with direction and/or strength of three-phase alternating current passing through each of the coils 11a, 11b and 11c of the stator 10, and the projecting poles 12a, 12b, 12c, and the N-pole magnet 22a and the S-pole magnet 22b act magnetically each other to thereby cause the relative motion between the stator 10 and the movable member 20 in the longitudinal direction of the stator 10. That is, the stator 10 and the movable member 20 mutually magnetically act, and the movable member 20 performs the relative motion in the longitudinal direction of the stator 10.

The position detector 30 (30L, 30R) includes, as shown in FIG. 4, a magnetic sensor 31 for detecting magnetism and a position detecting circuit 32 for converting a signal from the magnetic sensor 31 to a signal for specifying a position and detecting that position. Herein, the position detector 30 is one example of a position sensor.

Figure 3:
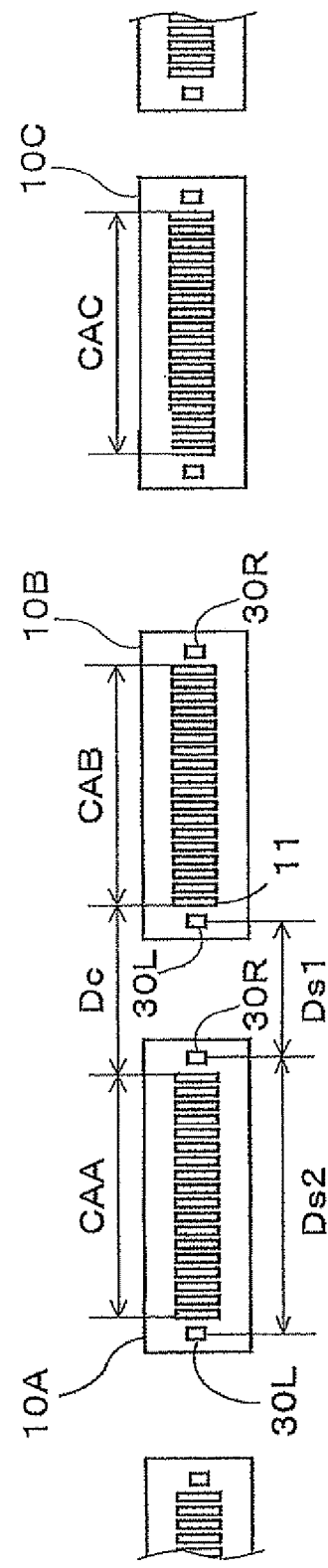
FIG. 3 is a plan view showing one example representing a distributed arrangement of the stators of FIG. 1.

The position detectors 30 are arranged, as shown in FIGS. 1 and 3, outside the projecting poles 12 disposed at the longitudinal both ends of the stators 10, and are disposed at central portions in the width directions of the stators 10. The magnetic sensor 31 is arranged so as to face on the side opposing to the movable member 20 of the stator 10. Further, it may be desired that the disposed positions of the detectors 30 are arranged with spaces in the longitudinal direction of the stators 10 as long as being not influenced by the coils 11. Furthermore, as shown in FIG. 4, the position detector 30R of the stator 10A is arranged outside the right-end coil 11c and the position detector 30L of the stator 10B is arranged outside the left-end coil 11a.

The magnetic sensor 31 detects the magnetic field generated by the driving magnet 22 extending in the direction of the relative motion between the stator 10 and the movable member 20. The magnetic sensor 31 detects variation of the magnetic field by the relative motion between the stator 10 and the movable member 20. Specifically, the magnetic sensor 31 is a sensor detecting the direction of the magnetic field (flux vector). In this case, the driving magnet 22 functions as one example of a scale portion for detecting the position of the movable member 20.

Next, as shown in FIGS. 1 and 5, the position information switch 35 generates an output to the motor driver 40 by selecting one of input signals from a plurality of position detectors 30. For example, the position information switch 35 outputs an input signal which was latest input. Furthermore, in a case when an input signal is only one signal, the position info information switch 35 outputs this signal as it is, and if no signal is input, no output signal is generated.

The magnetic sensor 31 constituting the position detector 30 will be explained hereunder with reference to the accompanying drawings.

Figure 6:
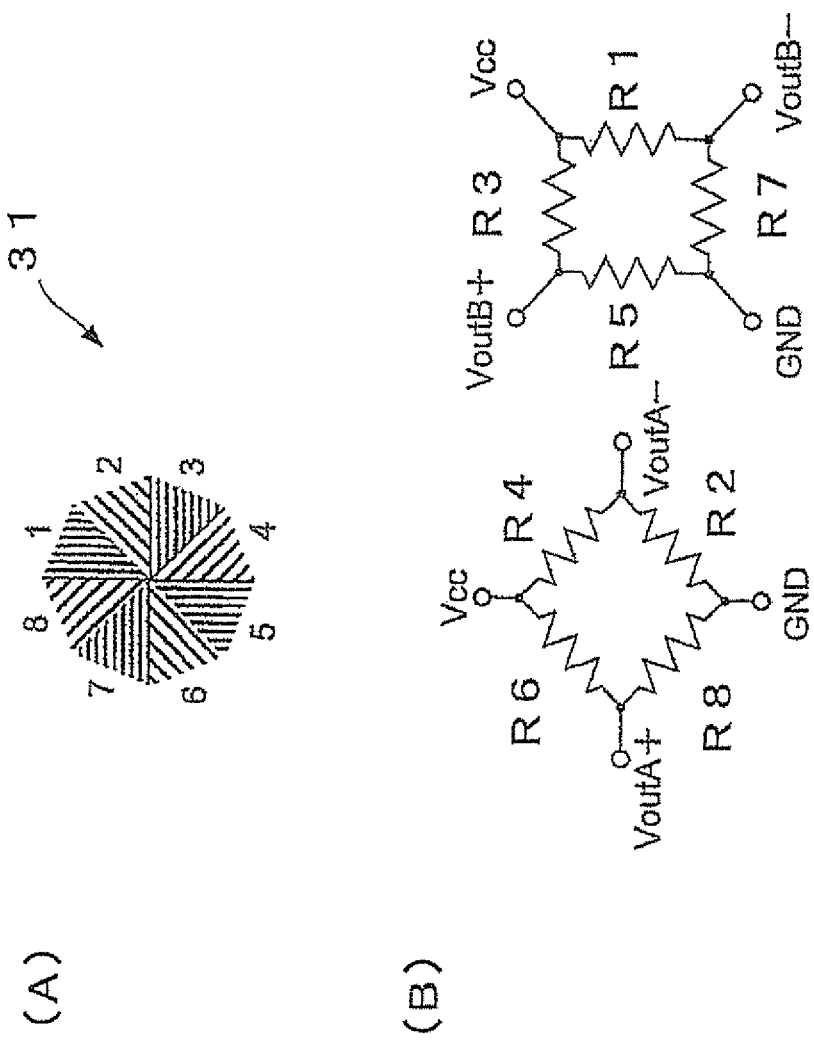
FIG. 6 is a view showing a magnetic sensor having two-set of full bridge structure constituting a position detector shown in FIG. 1 (in FIG. 5, (A) is a plan view showing a shape of a ferromagnetic thin metal of the magnetic sensor and (B) is a view showing an equivalent circuit).

FIG. 6 is a view showing two-set of magnetic sensor of full-bridge structure constituting the position detector of FIG. 1.

The magnetic sensor 31 of the position detector 30 has a magnetro-resistance element composed of Si or glass substrate and a ferromagnetic thin metal film of an alloy having main component of ferromagnetic metal such as Ni, Fe or like formed on the substrate. The magnetic sensor is called an AMR (Anisotropic-Magnetro-Resistance) sensor (anisotropic-magnetro-resisting element) because resistance value thereof varies in a specific field direction.

Figure 7:
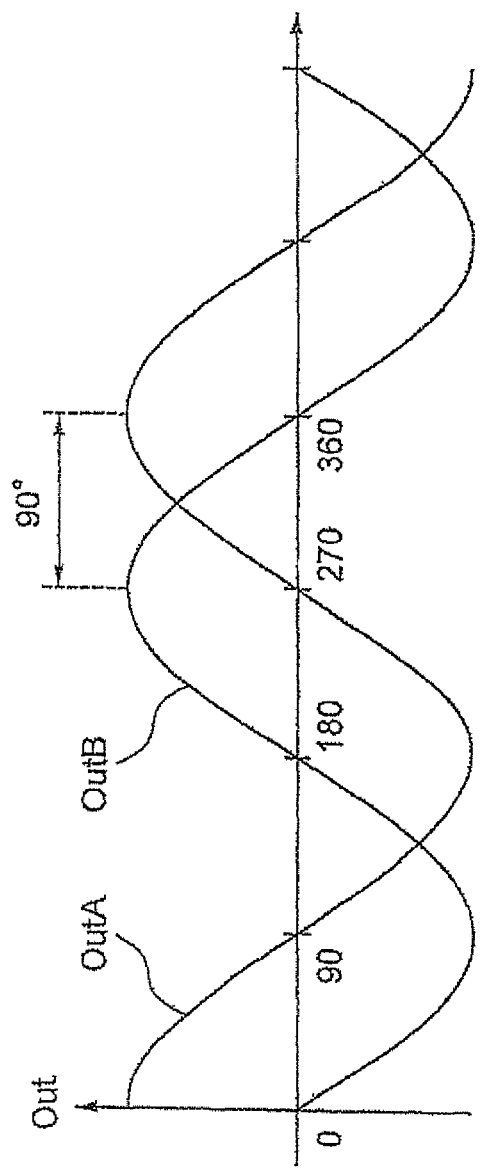
FIG. 7 is a graph showing sine-wave signal and cosine-wave signal generated from the magnetic sensor shown in FIG. 6.

As shown in FIG. 6, the magnetic sensor of the position detector 30 is formed on one substrate so that elements of two-sets of full bridge structure are inclined by 45 degrees from each other to acknowledge the direction of motion. Output powers VoutA and VoutB obtained by the two-sets of full bridge circuits constitute cosine wave and sin wave having phase difference of 90 degrees from each other as shown in FIG. 7. Since the magnets 22a and 22b are arranged alternately in the direction of the relative motion, the output of the position detector 30 forms the cosine and sin waves. As mentioned, the position detector 30 outputs the change in the direction of the magnetic field generated periodically by the relative motion based on the periodic structure of the driving magnet 22 for driving the movable member 20 as sin wave signal and cosine wave signal having phase difference of 90 degrees.

The output signal from the magnetic sensor is taken into the position detecting circuit 32, in which the output signal is converted into phase angle data having higher resolution by adding a digital-like interpolation processing to the sin wave signal and the cosine wave signal which have phase difference of 90 degrees.

Then, the position detector 32 produces, from this phase angle data, an A-phase encoder pulse signal (corresponding to the sin wave signal) and a B-phase encoder pulse signal (corresponding to the cosine wave signal), and generates a Z-phase pulse signal one time per one periodic cycle. The position signals of these A-phase encoder pulse signal, B-phase encoder pulse signal and Z-phase pulse signal are input into the position information switch 35. As shown in FIG. 5, the motor driver 40 controls the power converter 42 in response to the position signals of these A-phase encoder pulse signal, the B-phase encoder pulse signal and the Z-phase pulse signal.

Next, relationships in arrangement among the stators 10A, 10B and 10C, and between the stators 10A, 10B, 10C and the movable member 20 will be explained in detail with reference to FIGS. 3 and 4.

The stators 10A, 10B and 10C are arranged with a certain distance from each other (stator distance), in this order from the left side in the figure, in the longitudinal direction of the stators 10. A distance Dc between the coils of the adjacent stators 10A and 10B (distance between the adjacent stator coils) will be mentioned as one example of the stator distance.

The adjacent stator coil distance Dc is, for example, a distance between the right end of the right-end coil 11c of the stator 10A and the left end of the left-end coil 11a of the stator 10B.

Further, as another one example of the stator coil distance, there will be mentioned a distance Ds1 between the position detectors 30 of the adjacent stators 10A and 10B (adjacent stator sensor distance) This distance Ds1 between the position detectors 30 is, for example, a distance between the magnetic sensor 31 of the position detector 30R of the stator 10A and the magnetic sensor 31 of the position detector 30L of the stator 10B. That is, the adjacent stator sensor distance Ds1 is a distance between the magnetic sensor 31 of the position detector 30 most closer to the stator 10B among the position detectors 30 of the stator 10A and the magnetic sensor 31 of the position detector 30 most closer to the stator 10A among the position detectors 30 of the stator 10B.

Furthermore, the distance Dc between the adjacent stator coils is less than a length Lmv of the driving magnet 22. The length Lmv of the driving magnet 22 is a length, for example, as shown in FIG. 4, between the left end of the S-pole magnet 22b on the left-end side in FIG. 4 of the movable member 20 and the right end of the N-pole magnet 22a on the right-end side thereof. In the case where the distance Dc between the adjacent stator coils is less than the length Lmv of the driving magnet 22, at least a portion of the driving magnet 22 of the movable member 20 has a condition always opposing to at least either one of the coils 11 of the stators 10A and 10B. That is, the movable member 20 is in a condition capable of obtaining thrust force from at least either one of the stators 10A and 10B. This condition is applicable in a relation between the stators 10B and 10C.

Furthermore, the adjacent stator sensor distance Ds1 is less than the length Lmv of the driving magnet 22. In addition, the distance Ds2 between the position detector 30L (not shown) of the stator 10A and the position detector 30R of the magnetic sensor 31 is set also to be less than the length Lmv of the driving magnet 22. This design is the same as for the stators 10B and 10C. Under the state that the distances Ds1 and Ds2 satisfy the above conditions, the driving magnet 22 for the movable member 20 takes a condition capable of always detecting the magnetism by the magnetic sensor 31 of either one of the position detectors 30.

Further, the coil 11 of the stator 10 (10A, 10B, 10C) is positioned between the position detectors 30L and 30R. Accordingly, in a state in which at least a part of the driving magnet 22 of the movable member 20 faces the coil 11 of the stator 10, at least either one of the position detectors 30L or 30R is in a state of generating the position signal, that is in a state capable of detecting the position of the movable member 20. Namely, a state in which thrust force is given from the stator 10 to the movable member 20 is a state capable of detecting the position of the movable member 20, that is, a state capable of controlling the position of the movable member 20. An area in which the position of the movable member 20 is controlled, is called a control area CA (CAA, CAB, CAC) of the stator 10 (10A, 10B, 10C) as one example of the controllable region. The control area CAA is a region, as shown in FIG. 3, from the left end of the coil 11a of the left-end side of the stator 10A from the right end of the coil 11c of the right-end side thereof in the relative motion direction of the movable member 20 (i.e., a region corresponding to the length of the coil 11 of the stator 10A in the longitudinal direction). Similarly, the stators 10B and 10C also includes the control areas CAB and CAC, respectively.

Furthermore, as shown in FIG. 4, the position detector 30L is located to a position apart from the coil 11 of the stator 10B by a gap corresponding to the distance Dl. On the other hand, the position detector 30R is located to a position apart from the coil 11 of the stator 10A by a gap corresponding to the distance Dr. The section between these gaps is a section capable of detecting the position of the movable member 20, but is a section not to be controlled because the coil 11 does not oppose to the driving magnet 22 of the movable member 20.

Next, the superior controller 50 includes CPU, RAM and ROM and outputs a position command indicating an aimed position of the movable member 20 or a speed command indicating an aimed speed of the movable member 20 to the respective motor drivers 40A, 40B and 40C. Further, it is to be noted that this superior controller 50 is one example of a controlling device.

Herein, the motor driver 40 includes, as shown in FIG. 5, a controller 41 for controlling a current to be flown to the stator 10 of the linear motor, a power converter 42 for converting a power from a power source 45 in response to information from a sensor or like, and a current sensor 43 for detecting a power to be flown to the stator 10 by the power converter 42. Further, herein, the motor driver 40 is one example of a driving device.

Main reason why the motor drivers 40 are provided for the respective stators 10 resides in the independent control of the movable members 20 in a case where a plurality of movable members 20 exists. That is, in a case where each of the plural movable members 20 is placed on each of the different stators 10, each motor driver can independently control the current to be supplied to each stator, so that the moving direction, moving speed and so on of each of the movable members 20 can be independently controlled.

The controller 41 includes a CPU, a RAM, a ROM, a flash ROM and the like and is connected to the current sensor 43, the superior controller 51 via a control line 51, and the position information switch 35 via an encoder cable 52. Further, the controller 41 is, herein, one example of position controlling means, back-calculating means and moving speed calculating means.

Furthermore, the controller 41 controls the power converter 42 such as PWN inverter (PWM: Pulse Width Modulation), and finally controls the current to be supplied to the coil 11 of the stator 10.

More specifically, the controller 41 performs feedback control (position control) of the position of the movable member 20 as one example of the position controlling means. In such position controlling, the controller 41 calculates the present position of the movable member 20 from the pulse number of the position signal inputted through the encoder cable 52. Then, the controller 41 calculates a position (location) deviation by calculating difference between the position command value and the present position. Furthermore, the controller 41 multiplies a positional gain as a proportional gain preliminarily set to thereby calculate the speed command value. In addition, the controller 41 differentiates in time the present position and calculates the present speed of the movable member 20. Thereafter, the controller 41 calculates torque command value by, for example, PID control, based on the speed command value and the present speed. The controller 41 also controls the power converter 42 so as to supply current corresponding to the torque command value to the coil 11.

Figure 8:
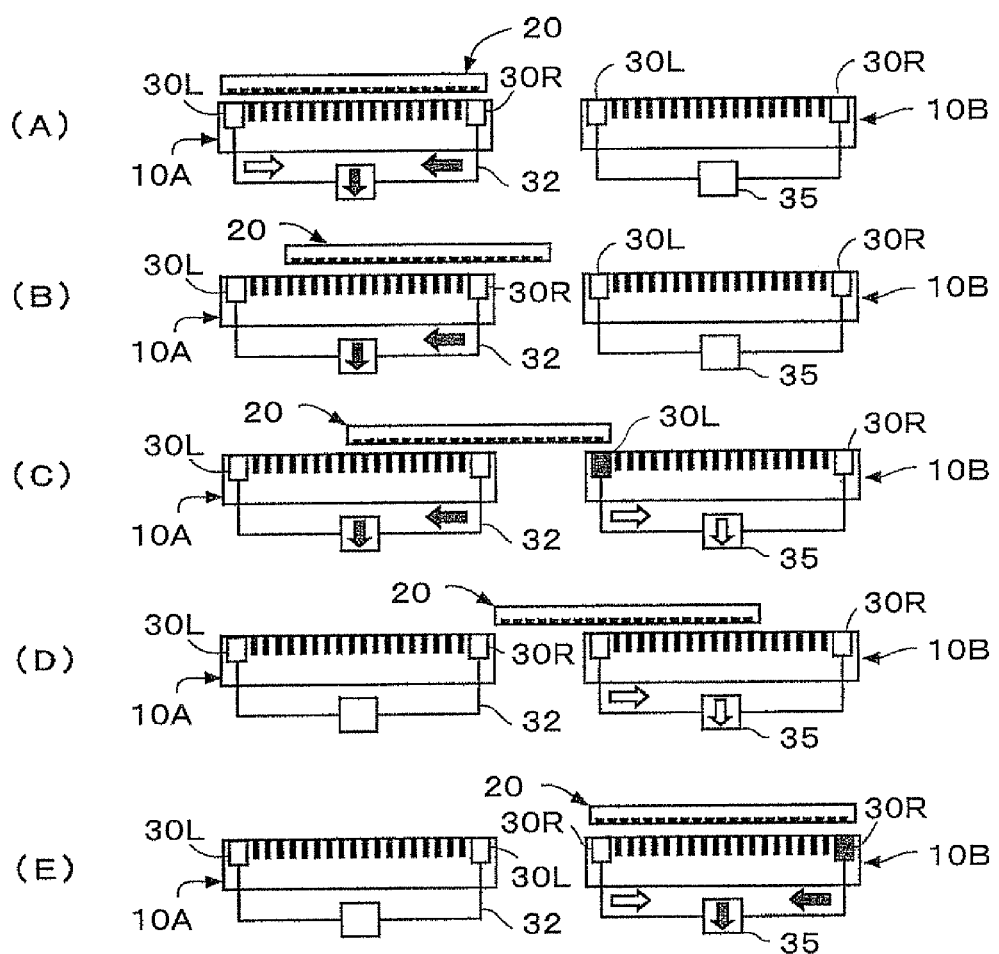
FIG. 8 is a pattern diagram showing an example in which the movable member moves in a manner straddling the stators.

Next, a control mode in a case where the movable member 20 moves in a state straddling the space between the stator 10A and the stator 10B with reference to FIG. 8. It is further to be noted that the states shown in FIG. 8 represents the case where the distance Ds2 between the sensors of the same stator approximately equals to the length Lmv of the movable member 20.

In a state shown in FIG. 8(A), the movable member 20 is positioned in the control area CAA of the stator 10A, and the driving magnet 22 for the movable member 20 is mounted on the two position detectors 30L and 30R of the stator 10. In this arrangement, the two position detectors 30L and 30R transmit signals. Here, it is supposed that the position information switch 35 outputs the signal from the position detector 30R. At this time, the superior controller 50 outputs the position command value to the motor driver 40A and the motor driver 40B for moving the movable member 20 from the stator 10A to the stator 10B. On the other hand, the position detectors 30L and 30R of the stator 10B do not generate any signal at this moment. Further, in FIG. 8, arrows show presence or absence of outputs from the position detectors 30L, 30R and the position information switch 35. Furthermore, the kinds of the arrows show which of the signal of the position detectors 30L and the signal of the position detectors 30R is output by the position information switch 35.

The controller 41 of the motor driver 40A performs the position controlling in response to the position command value from the superior controller 50 and the position signal from the position detector 30R of the stator 10A. At this time, since there causes a deviation between the position command value and the present position of the movable member 20, the motor driver 40A supplies current to the stator 10A. Thus, since the thrust force is applied from the stator 10 to the movable member 20, the movable member 20 travels rightward on the drawings as shown in FIG. 8(B).

As shown in FIG. 8(C), the movable member 20 rides on the stator 10B and enters the control area CAB of the stator 10B. Even if the movable member 20 enters the control area CAB, the movable member 20 is not completely separated from the control area CAA of the stator 10A. That is, a part of the magnets 22 for driving (driving magnet 22) of the movable member 20 opposes to the coil 11 of the stator 10A. Thus, it may be said that the position controlling by the controller 41 of the motor driver 40A has being continued.

Further, in a moment when the movable member 20 reaches the stator 10B, the position detector 30L of the stator 10B generates a signal sensitively responding to the driving magnet 22 disposed on the lower surface of the movable member 20. Then, the position information switch is changed from the state that any position signal is not output to the state that a position information signal is ready for outputting. At this time, the controller 41 of the motor driver 40B detects the change of the signal from the position information switch 35.

Herein, at an instance when the position detector 30L of the stator 10B starts to generate a signal, the position of the position detector 30L is set as an original (start) point. Then, the controller 41 of the motor driver 40B initializes the position command value and the present position of the movable member 20 to the relative positions from this original point. Thereafter, the position controlling by the controller 41 of the motor driver 40B and the current supply to the stator 10B by the motor driver 40B based on this position controlling start.

However, if the controller 41 of the motor driver 40B performs the position controlling as in this state, there will cause the following phenomenon.

Even at a time when the movable member 20 advances into the control area CAB of the stator 10B, the controller 41 of the motor driver 40A still continues the position controlling, and the movable member 20 travels by the thrust force from the stator 10A. Therefore, even if the movable member 20 travels as it is, as viewed from the controller 41 of the motor driver 40B, the position command value and the present position of the movable member 20 still accord with each other. That is, no position (location) deviation is generated, and accordingly, any current is not supplied to the stator 10B from the motor driver 40B and any thrust force is not applied to the movable member 20 from the stator 10B.

However, since the movable member 20 is applied with the thrust force from the stator 10A, the movable member 20 continuously travels, as shown in FIG. 8D, till the driving magnet 22 of the movable member 20 separates from the position opposing to the coil 11 of the stator 10A. However, the driving magnet 22 of the movable member 20 separates from the position opposing to the coil 11 of the stator 10A, the thrust force of the movable member 20 is once vanished, and because of such reason, the movable member 20 is decelerated. By the deceleration of the movable member 20, the position deviation is firstly generated as viewed from the controller 41 of the motor driver 40B. According to such phenomenon, the motor driver 40B supplies the current to the stator 10B, and the movable member 20 is applied with the thrust force from the stator 10B and is then again accelerated and further travels as shown in FIG. 8(E). That is, the speed variance is caused at a time when the movable member 20 travels between the adjacent stators in a straddling state.

Then, in the present embodiment, when the movable member 20 straddles between the adjacent stators, the present position of the movable member 20 is corrected so as to perform the position controlling while smoothly travelling the movable member 20.

More specifically, as shown in FIG. 8(C), at an instance when the movable member 20 enters into the control area CAB of the stator 10B, the controller 41 of the motor driver 40B, being an example of the moving speed calculating means, differentiates in time the position command value from the superior controller 50 to thereby calculate the traveling (running) speed of the movable member in response to the position command value. After the outputting of the position signal from the position detector 30L of the stator 10B has started, when the movable member 20 moves through the gap, corresponding to the distance Dl, between the position detector 30L and the coil 11 of the stator 10B, the movable member 20 enters into the control area CAB. Accordingly, the controller 41 calculates the moved distance in the rightward direction on the drawing of the movable member 20 based on the pulse of the position signal after the starting of the outputting of the position signal by the position detector 30L. Then, when the movable member 20 moves by the distance Dl in the rightward direction in the drawing, the controller 41 discriminates that the movable member 20 enters into the control area CAB. Further, the distance Dl and distance Dr of the corresponding stator are preliminarily set to a flash ROM of the controller 41.

In the next step, the controller 41 performs a back-calculation of the position deviation from the calculated travelling speed, which is identified as speed command value, as one example of the back-calculating means. That is, the controller 41 calculates the position deviation by dividing the calculated travelling speed by the position gain. Next, the controller 41 back calculates the present position of the movable member 20 from the back-calculated position deviation as one example of the back-calculating means. That is, the controller 41 calculates the present position of the movable member 20 by obtaining difference between the position command value from the superior controller 50 and the back-calculated position deviation.

Thereafter, the controller 41 starts the position controlling by utilizing the back-calculated present position of the movable member 20. That is, the controller 41 calculates the position deviation from the back-calculated present position of the movable member 20 and the input position command value and then calculates the speed command value by multiplying the position gain to the position deviation. Thereafter, the controller 41 performs the position controlling while adding, to the present position of the movable member 20, moving distance corresponding to the pulse numbers of the position signal input from the position detector 30. In accordance with the above-mentioned steps, the controller 41 corrects the present position of the movable member 20.

According to the position correction mentioned above, there causes a state in which position deviation corresponding to the travelling speed calculated at an entrance of the movable member 20 into the control area CAB of the stator 10B, and therefore, current is hence supplied from the motor driver 40B to the stator 10B, and the movable member 20 obtains the thrust force from the stator 10B.

That is, the movable member 20 obtains the thrust force from both the stators 10A and 10B from the position shown in FIG. 8(C) to the position shown in FIG. 8(D). After the time of the state shown in FIG. 8(D), the movable member 20 obtains the thrust force only from the stator 10B. Further, since the position deviation is back-calculated based on the travelling speed obtained by differentiating in time the position command value at the position shown in FIG. 8(C), the movable member 20 can be smoothly moved into the control area CAB of the stator 10B from the control area CAA of the stator 10A without the real moving speed changing.

Further, although an error corresponding to the back-calculated position deviation may be caused between the present position of the movable member 20 obtained by the correction and the actual present position of the movable member 20, if this error is within a range allowable in the use of the distributed arrangement linear motor 1, the causing of such error is no problem.

Hereunder, the operation of the controller 41 of the motor driver 40 will be explained with reference to the flowchart of FIG. 9, which is a flowchart representing a processing example of the controller of the motor driver shown in FIG. 5.

Figure 9:
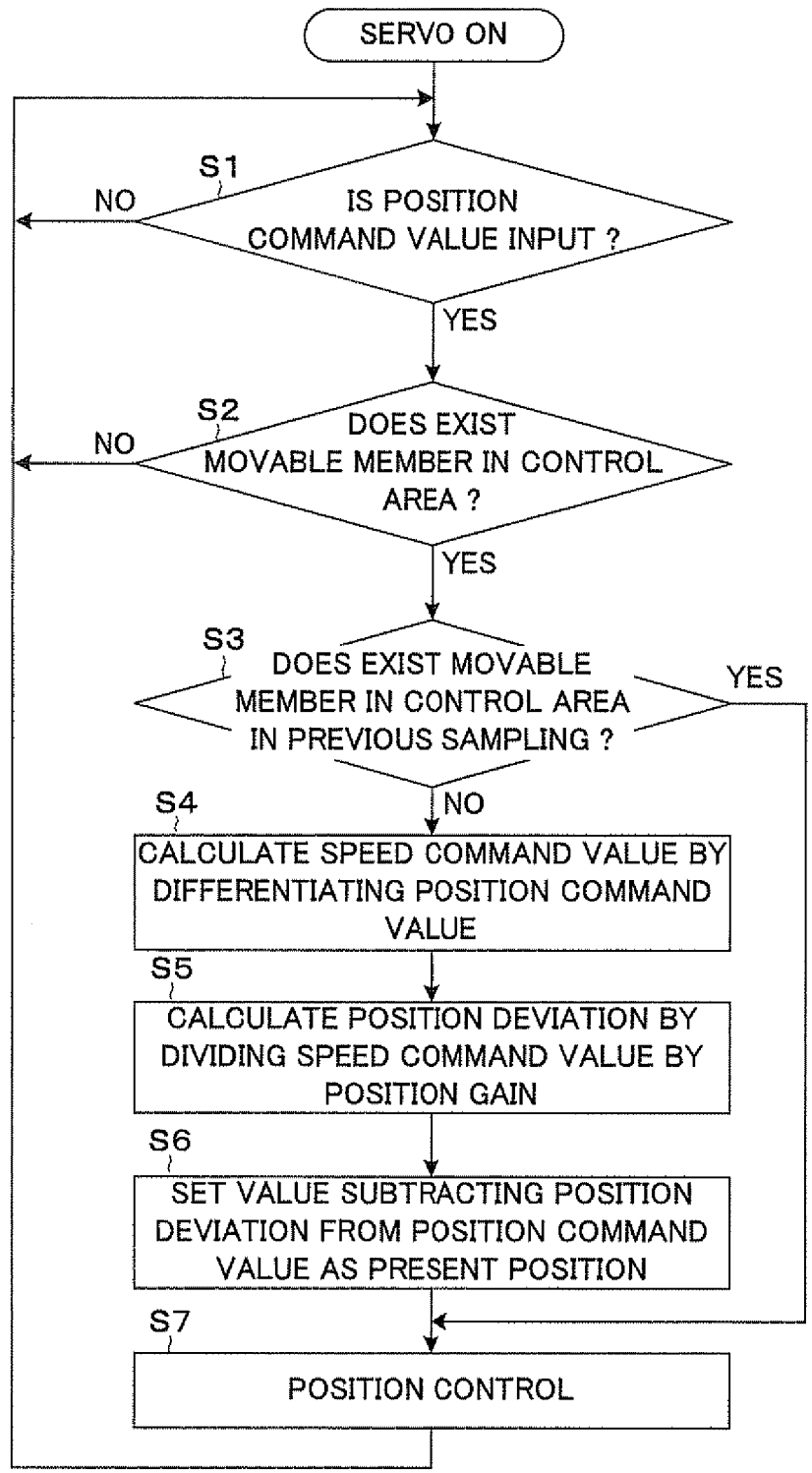
FIG. 9 is a flowchart illustrating one process example of a controller of the motor driving device shown in FIG. 5.

The processing shown in FIG. 9 will start upon a state of a servo "On". At first, the controller 41 judges whether a position command value is input from the superior controller 50 or not (step S1). At this time, in a case where any position command value is not input (Step S1: NO), the judgment of the step S1 is again made.

On the other hand, in a case where the position command value is input (step S1: YES), the controller 41 performs sampling of the input position command value, and judges whether the movable member 20 is present within the control area CA of the stator 10 or not (step S2). At this time, in a case where the movable member 20 does not exist within the control area CA (step S2: NO), the step returns to the step S1.

On the other hand, in a case where the movable member 20 is present within the control area CA of the stator 10 (step S2: YES), the controller 41 judges whether the movable member 20 exists within the control area CA at the previous sampling time or not (step S3: YES). In a case where the movable member 20 does not exist within the control area CA at the previous sampling time and the movable member 20 exists within the control area CA at the present sampling time, there is indicated that the movable member 20 first enters within the control area at this sampling operation. Then, in a case where the movable member 20 does not exist within the control area CA at the previous sampling time (step S3: NO), the input position command value is differentiated in time to thereby calculate the speed command value (step S4). Since the position command value has been input before the entrance of the movable member 20 in the control area CA, the time-differentiation of the position command value can be made.

Next, the controller 41 calculates the position deviation by dividing the calculated speed command value by the position gain (step S5). Subsequently, the controller 41 calculates the present position by subtracting the calculated position deviation from the input position command value (step S6).

Then, the controller 41 performs a first position control with the thus calculated present position being as the present position of the movable member 20 (step S7). That is, the controller 41 calculates the position deviation between the input position command value and the present position calculated in the step S6, and then, calculates the speed command value by multiplying this position deviation to the position gain. Thereafter, the controller 41 performs the speed controlling and torque controlling based on the calculated speed command value and so on. After such calculations, the controller 41 returns to perform the step S1.

As mentioned above, when the position controlling starts, it is judged that the movable member 20 existed within the control area in the previous sampling time in judgment of the subsequent step S3 (step 3: YES). In such case, the controller 41 performs a usual position control (step S7). Here, the controller 41 calculates the moving distance of the movable member 20 from the previous sampling time from the input position signal, and the present position of the movable member 20 to be used for the present position controlling by adding the calculated moving distance to the present position of the movable member in the previous sampling time.

As explained hereinabove, according to the present embodiment, the driving system of the distributed arrangement linear motor includes: the linear motor including the movable member 20 and the stators 10A, 10B, 10C, the movable member 20 being provided with the magnet 22 for the driving, the stators 10A, 10B, 10C each including the coil 11 and the position detector 30 for detecting the position in the relative motion of the movable member 20 from the driving magnet 22, in which the movable member 20 moves in the direction of the relative motion to the stators 10; and the motor drivers 40A, 40B, 40C each controlling the electric current to be supplied to the coil 11 of the corresponding stators 10A, 10B, 10C.

The stators 10A, 10B, 10C are arranged in the direction of the relative motion of the movable member 20, the distance between the coils of the adjacent stators is less than (not more than) the length of the driving magnet 22 in the direction of the relative motion, and the distance Ds1 between the sensors of the adjacent stators is less than the length of the driving magnet 22 in the direction of the relative motion.

The controller 41 of each of the motor drivers 40A, 40B, 40C calculates the position deviation between the position command value from the superior controller 50 and the present position of the movable member 20 detected by the position detector 30 of the corresponding stator, and performs the position controlling for calculating the speed command value based on the calculated position deviation and the position gain. When the movable member 20 enters into the control area in which at least one of the magnet of the driving magnets 22 opposes to the coil of the corresponding stator within the area of which position is detected by the position detector 30 of the corresponding stator, the controller 41 further operates to perform the back-calculation of the position deviation with the traveling speed of the movable member being as the speed command value, performs the back-calculation of the position of the movable member 20 from the position deviation and the position command value, and by supposing the back-calculated position as the present position of the movable member 20 at the time of entering the control area, the present position detected by the detector 30 is corrected to thereby control the position of the movable member. Accordingly, when the movable member 20 moves in the state straddling between the adjacent stators, undesirable variation in the traveling speed of the movable member 20 can be prevented from causing, and hence, the movable member can be controlled in position while smoothly driving the movable member 20.

Furthermore, the controller 41 calculates the traveling speed of the movable member 20 by differentiating the position command value and back-calculates the position deviation with this traveling speed being as the speed command value. Accordingly, the position controlling can start from the time of entrance of the movable member 20 into the control area.

Furthermore, since the magnetic sensor 31 of the position detector 30 detects the present position of the movable member 20 by detecting the magnetism of the driving magnet 22, it is not necessary to provide the linear scale to the movable member 20, thus making simple the structure of the linear motor.

Further, in the embodiment described above, although the controller 41 calculates the traveling speed of the movable member 20 by differentiating the position command value, it may be possible to calculate the traveling speed of the movable member 20 by differentiating the present position of the movable member detected by the position detector 30 and then to back-calculate the position deviation with this traveling speed being as the speed command value. According to this modification, the position controlling may be started by reflecting the actual traveling speed of the movable member 20.

Furthermore, in the embodiment described above, although the magnetic sensor 31 detects the position of the movable member 20 by detecting the magnetism of the driving magnet 22, it may be possible to locate the linear scale to the movable member and locate a position sensor that can optically or magnetically read the linear scale to the stator 10. Moreover, in such modification, it is not necessary to locate the position sensor outside the coil 11, and the position sensor may be located at both end portions or inside of the coil 11 in the direction of the relative motion of the movable member 20. In either one of the above cases, the distance Dc between the coils of the adjacent stators is less than the length of the driving magnet 22 in the direction of the relative motion of the movable member, and the distance Ds1 between the sensors of the adjacent stators is less than the length of the driving magnet 22 in the direction of the relative motion.

Still furthermore, in an arrangement in which the position sensors are disposed at both end portions or inside of the coil 11 in the direction of the relative motion of the movable member 20, an area ranging from the left end side position sensor to the right end side position sensor is deemed as the control area CA. Accordingly, since the output start timing of the position signal from the position sensor and the entering timing of the movable member into the control area CA are coincident with each other, it is not necessary for the controller 41 to compensate for the gap corresponding to the distance Dl or Dr.

Still furthermore, in this modification, at a time when the controller 41 calculates the traveling speed of the movable member 20 as the speed command value by differentiating the position command value, since it is necessary to perform plural sampling operations to the position signal from the position sensor, it is necessary for the controller 41 to start the position controlling in a slightly delayed timing from the entering timing of the movable member into the control area CA.

On the other hand, in a case when the controller 41 calculates the traveling speed of the movable member 20 as the speed command value by differentiating the position command value, since the position command value is input before the entrance of the movable member 20 into the control area CA, the controller 41 can start the position controlling in the timing at which the movable member 20 enters the control area CA.

Furthermore, it may be possible to elongate the coil portion 11 of the stator 10 in a manner so that the distance between the left side end position sensor and the right side end position sensor exceeds the length of the linear scale (the length Lmv of the driving magnet 22 when the position of the movable member 20 is detected by detecting the magnetism of the driving magnet 22 by the position sensor). In such case, it may be possible to further locate a position sensor between the left side end position sensor and the right side end position sensor so that the distance between the adjacent position sensors becomes less than the length of the linear scale.

It is further to be noted that the present invention is not limited to the embodiments described above, and the described embodiments are modes or examples for embodying the invention, and every one, which has a structure substantially the same as the technical idea recited in the scope of the appended claim of the present invention and attains functions and effects identical to those obtainable by the present invention, is included in the technical scope of the present invention.

REFERENCE NUMERALS

1 - - - distributed arrangement linear motor; 10 (10A, 10B, 10C) - - - stator; 11 - - - coil; 20 - - - movable member; 22 - - - magnet for driving; 30, 30L, 30R - - - position detector; 40 (40A, 40B, 40C) - - - motor driver; 41 - - - controller; 50 - - - superior controller.

The invention claimed is:

1. A driving system of a linear motor, comprising:
a linear motor including a movable member and a plurality of stators, the movable member being provided with a magnet portion and a scale portion, the magnet portion including a plurality of magnets arranged side by side, the plurality of stators each including a coil and a position sensor for detecting, from the scale portion, a position of the movable member in a moving direction along which the magnets are arranged side by side, in which the movable member moves in the moving direction; and
a plurality of driving devices each of which controls an electric current flowing the coil of the corresponding stator,
wherein the plural stators are arranged in the moving direction of the movable member, a distance between the coils of the adjacent stators is less than a length of the magnet portion in the moving direction of the movable member, and a distance between the position sensors of the adjacent stators is less than a length of the scale portion; and
wherein each of the driving devices includes a position controller for performing position controlling by calculating a deviation between a position command value from a controller and a position detected by the position sensor of the corresponding stator and then calculating a speed command to be used for the speed controlling of the movable member based on the deviation and a position gain, and a back-calculating unit for back-calculating the deviation with the moving speed of the movable member being as a speed command and then back-calculating the position of the movable member from the deviation and the position command when the movable member enters a control area in which at least one of the magnets of the magnet portion opposes to the coil of the stator within an area of which a position is detected by the position sensor of the corresponding stator, in which the position controller performs the position controlling by correcting the position detected by the position sensor with the position calculated by the back-calculating unit being as a position of the movable member at a time when the movable member enters the control area.

2. The driving system of a linear motor according to claim 1, wherein each of the driving devices further includes a moving speed calculating unit for calculating a moving speed by differentiating the position command value, and the back-calculating unit performs back-calculation of the deviation from the moving speed calculated by the moving speed calculating unit.

3. The driving system of a linear motor according to claim 1, further comprising a moving speed calculating unit for calculating a moving speed by differentiating the position detected by the position sensor, and the back-calculating unit performs back-calculation of the deviation from the moving speed calculated by the moving speed calculating unit.

4. The driving system of a linear motor according to claim 1, wherein the position sensor detects the position of the movable member by detecting magnetism of the magnet portion as the scale portion.

5. A method of controlling a linear motor which includes: a movable member provided with a magnet portion and a scale portion, the magnet portion including a plurality of magnets arranged side by side; and a plurality of stators each including a coil and a position sensor for detecting a position of the movable member in a moving direction along which the magnets are arranged side by side, in which the movable member moves in the moving direction, wherein:
the plural stators are arranged in the moving direction of the movable member;
a distance between the coils of the adjacent stators is less than a length of the magnet portion in the moving direction of the movable member;
a distance between the position sensors of the adjacent stators is less than a length of the scale portion;
a deviation is back-calculated by dividing the moving speed of the movable member by a position gain at a time when the movable member enters a control area in which at least one of the magnets of the magnet portion opposes to the coil of the stator within an area of which position is detected by the position sensor of the stator;
the position of the movable member is back-calculated by subtracting the deviation from the position command from a controller; and
feedback control of the position of the movable member is performed by correcting the position detected by the position sensor with the back-calculated position being as the position of the movable member at a time when the movable member enters the control area.

* * * * *